Nov. 23, 1943.  D. R. BERLIN ET AL  2,334,984
ADJUSTABLE WING GUN MOUNT
Filed March 8, 1940   5 Sheets-Sheet 1

INVENTORS
DONOVAN R. BERLIN and
BY CLEM G. TRIMBACH.
ATTORNEY

Nov. 23, 1943.　　D. R. BERLIN ET AL　　2,334,984
ADJUSTABLE WING GUN MOUNT
Filed March 8, 1940　　5 Sheets-Sheet 3

INVENTORS
DONOVAN R. BERLIN and
BY CLEM G. TRIMBACH.
ATTORNEY

Nov. 23, 1943.                D. R. BERLIN ET AL                    2,334,984
                            ADJUSTABLE WING GUN MOUNT
                            Filed March 8, 1940          5 Sheets-Sheet 4
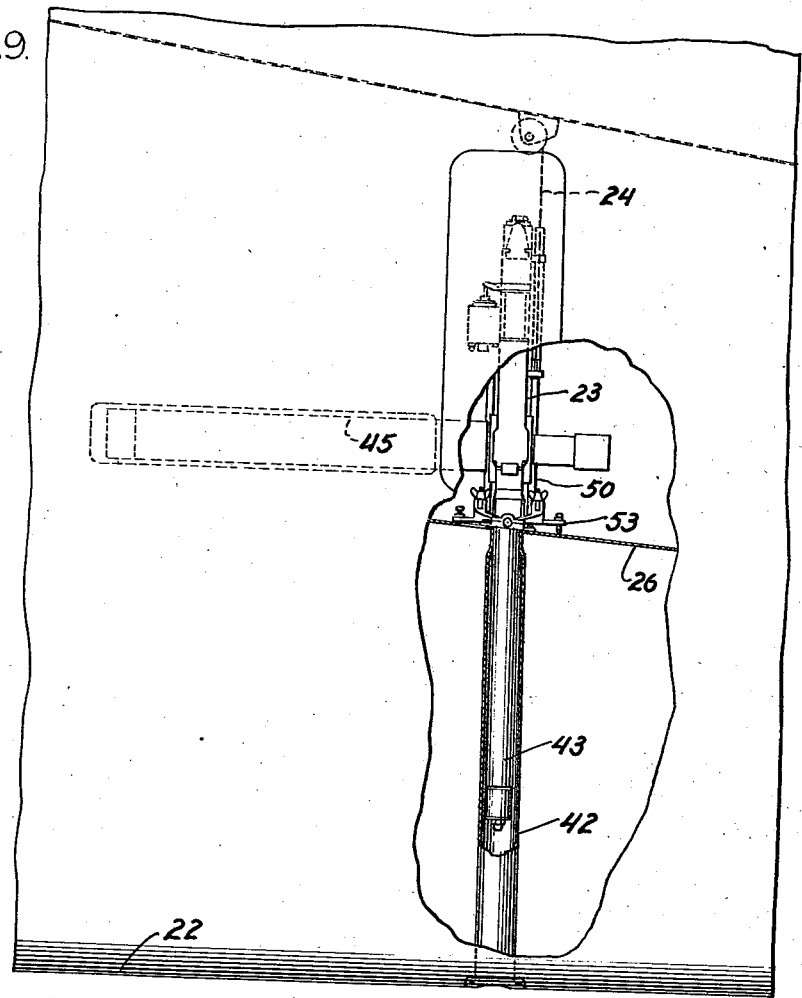
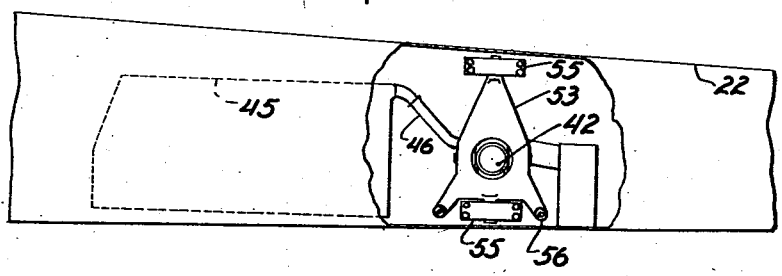
INVENTORS
DONOVAN R. BERLIN and
BY CLEM G. TRIMBACH.
ATTORNEY Nov. 23, 1943.   D. R. BERLIN ET AL   2,334,984
ADJUSTABLE WING GUN MOUNT
Filed March 8, 1940   5 Sheets-Sheet 5

INVENTORS
DONOVAN R. BERLIN and
BY CLEM G. TRIMBACH.
ATTORNEY

Patented Nov. 23, 1943

2,334,984

UNITED STATES PATENT OFFICE 2,334,984

ADJUSTABLE WING GUN MOUNT

Donovan R. Berlin and Clem G. Trimbach, Eggertsville, N. Y., assignors to Curtiss-Wright Corporation, a corporation of Delaware Application March 8, 1940, Serial No. 324,780

4 Claims. (Cl. 89—37.5)

This invention relates to aircraft armament and is particularly concerned with improvements in the mounting of machine guns in an aircraft wing.

An object of the invention is to provide a fixed gun mount particularly suitable for the support of one or more machine guns in the wing of a large aircraft.

A further object is to provide a gun mount of low overall height adapted for use with a single deep beam such as is used in an aircraft wing.

A further object is to provide means for adjusting the elevation and traverse of fixed guns in aircraft and also to provide means by which the aircraft crew may change gun elevation with respect to the flight axis of the airplane during flight.

Conventional practice in the past has been to mount machine guns either on the aircraft fuselage or in the wing, either for firing clear of the propeller disc or through the propeller disc. Ordinarily such guns are sighted on the ground for a particular range with reference to the longitudinal axis of the aircraft and no provision has been made for adjusting the range or elevation of the guns in flight. Flight adjustment is desirable to enable the aircraft crew to properly range a target at varying distances from the aircraft.

Conventional wing gun mounts have been constructed to provide an adapter secured at its ends to the front and rear spars of an aircraft wing, within or upon which adapter the gun is secured for firing through the front spar and through the leading edge of the wing. However, as the size of aircraft has increased while the length of the lock or breech of machine guns has remained substantially constant, such adapters have become unnecessarily long so that one of the objects of the invention is to decrease the weight of the gun installation by making the adapter a cantilever supported wholly by one of the wing spars.

Still another object of the invention is to provide a mounting organization for a plurality of fixed guns which may be adjusted for range as a unit while the aircraft is in flight.

Further objects of the invention will become apparent in reading the annexed detailed description in connection with the drawings, in which:

Fig. 9 is a fragmentary plan of a wing showing an alternate arrangement;

Fig. 10 is a front elevation, partly broken away, showing the alternative arrangement;

Figure 1:
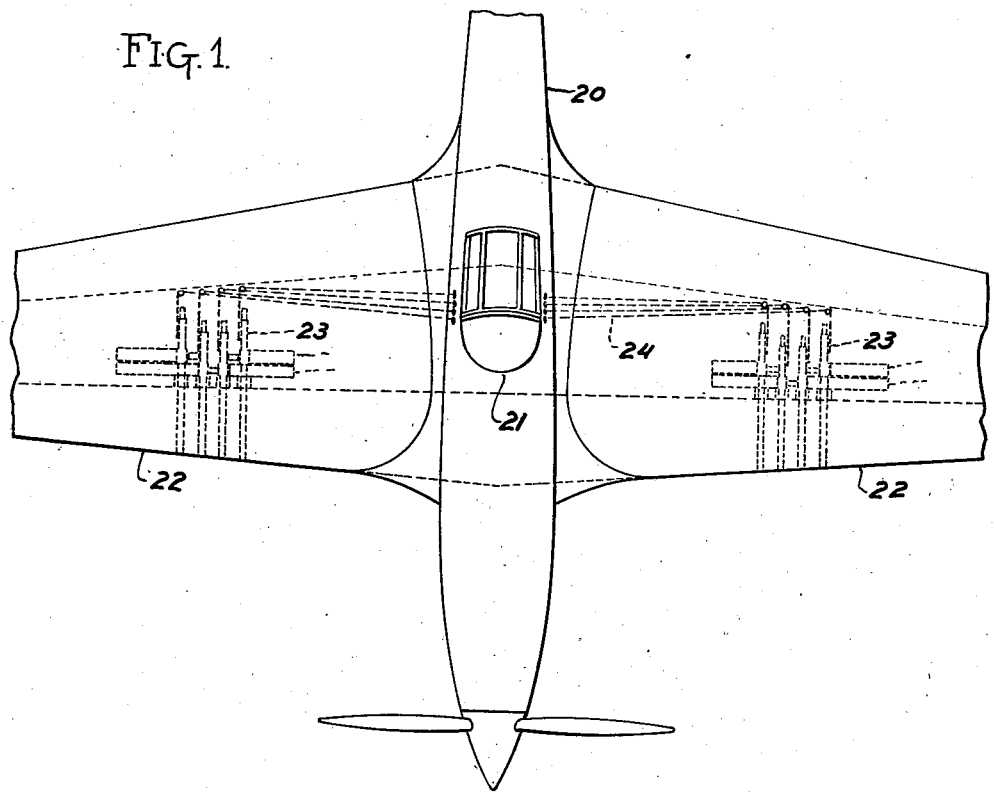
Fig. 1 is a plan of an aircraft incorporating the invention.
Figure 2:
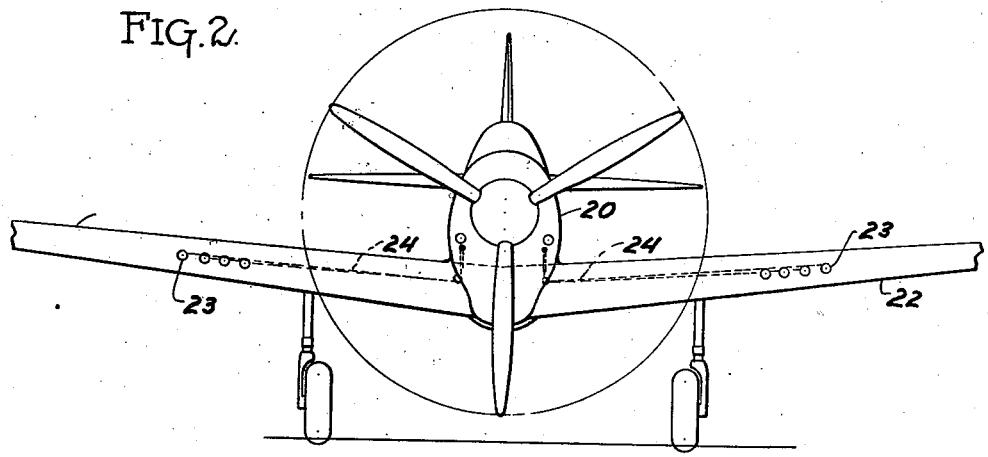
Fig. 2 is a front elevation.

In the two embodiments shown respectively in Figs. 1 to 8 and 9 to 13, corresponding parts will be given the same numbers. In Figs. 1 and 2 in particular, 20 indicates an aircraft fuselage having a pilot's or gunner's compartment 21, wings 22 extending laterally from the fuselage each carrying a plurality of machine guns 23 selectively operable by a trigger under the control of the pilot. Cables 24, one for each gun, are shown as leading from the cockpit to the charging handles of respective guns for the purpose of preparing the guns for action or for clearing jams which may occur in operation.

Figure 6:
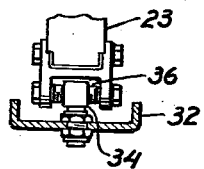
Fig. 6 is a section on the line 6—6 of Fig. 5.
Figure 7:
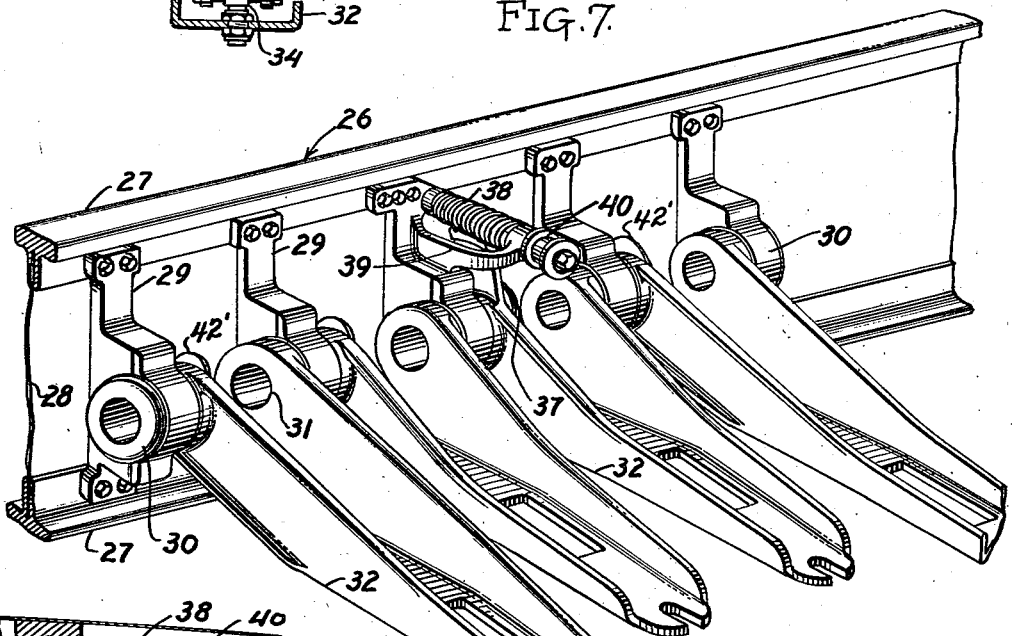
Fig. 7 is an enlarged perspective view of the gun adapters and wing beam.
Figure 8:
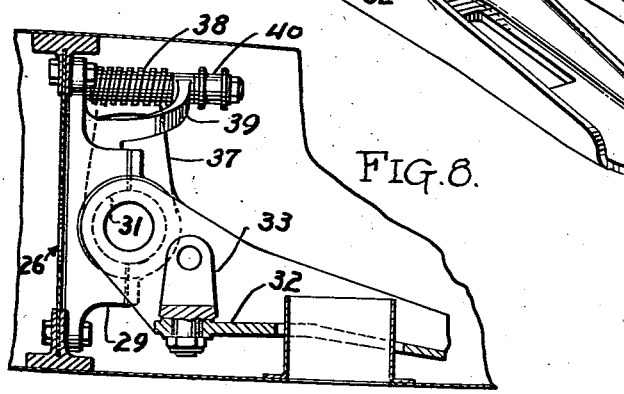
Fig. 8 is an enlarged fragmentary section through a portion of the wing showing the attachment of the adapter through the wing beam.
Figure 11:
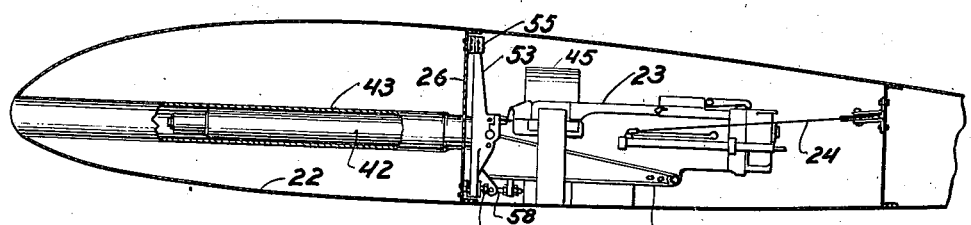
Fig. 11 is a section through the wing showing the alternate arrangement.
Figure 12:
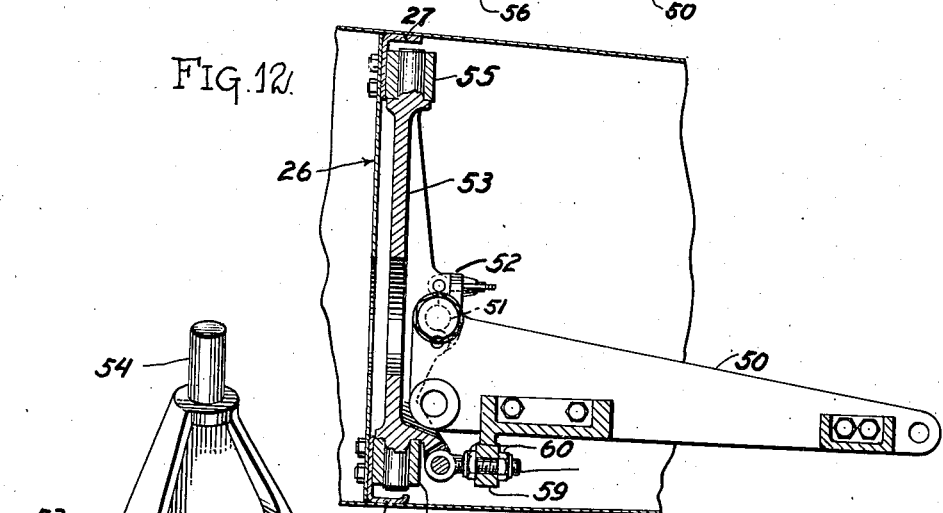
Fig. 12 is an enlarged fragmentary section through the wing beam and adapter.
Figure 13:
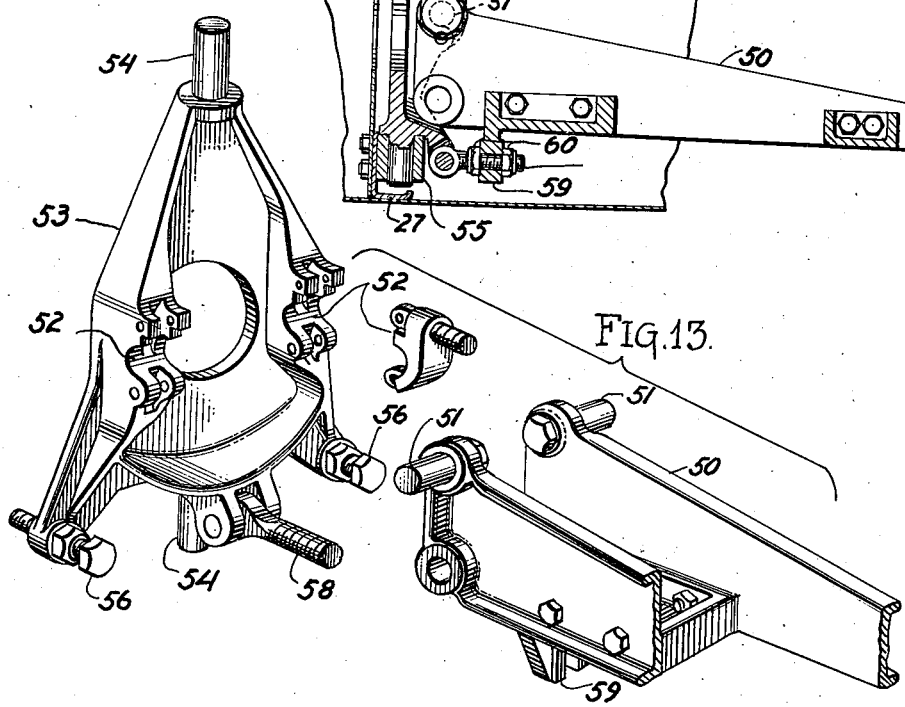
Fig. 13 is a disassembled perspective view of the components of the alternative embodiment of the gun mount.

Referring to Figs. 3 to 8, we show a main wing spar 26 comprising upper and lower chord members 27 and a web 28. Bridging the chord members, and secured thereto, are a plurality of bearing units 29 comprising bearings 30 in which are borne the trunnions 31 of a plurality of individual gun carrying adapters 32 which are formed in general as channel sections carrying front and rear gun brackets 33 and 34 to which machine guns 23 are secured. The rear bracket 34, as shown in Fig. 6, comprises a traversing screw 36 by which the guns may individually be adjusted in traverse. All of the adapters are movable as a unit in elevation in virtue of being constructed as one element or alternately, being constructed as individual elements secured to one another at their trunnions. To effect the joint movement in elevation, and to secure them in elevation, one of the adapters, as at 37, is provided with a worm wheel segment engaged by a worm 38 borne in a bracket 39 and in the corresponding bearing member 29. The worm 38 may be provided with a pulley 40 from which a cable 41 may be led to the crew quarters whereby the crew may simultaneously adjust all guns in elevation as desired.

The barrels 42 of the several guns project through suitable openings 42' in the beam web 28 toward the leading edge of the wing. Each gun is embraced by a blast tube 43 having clearance relation with its barrel, the blast tube terminating at the wing leading edge and having sufficient clearance relation with the gun barrel to allow of changes in elevation and traverse of the gun as are permitted by the traversing screw 36 and the worm and wheel connection 37, 38.

Figure 3:
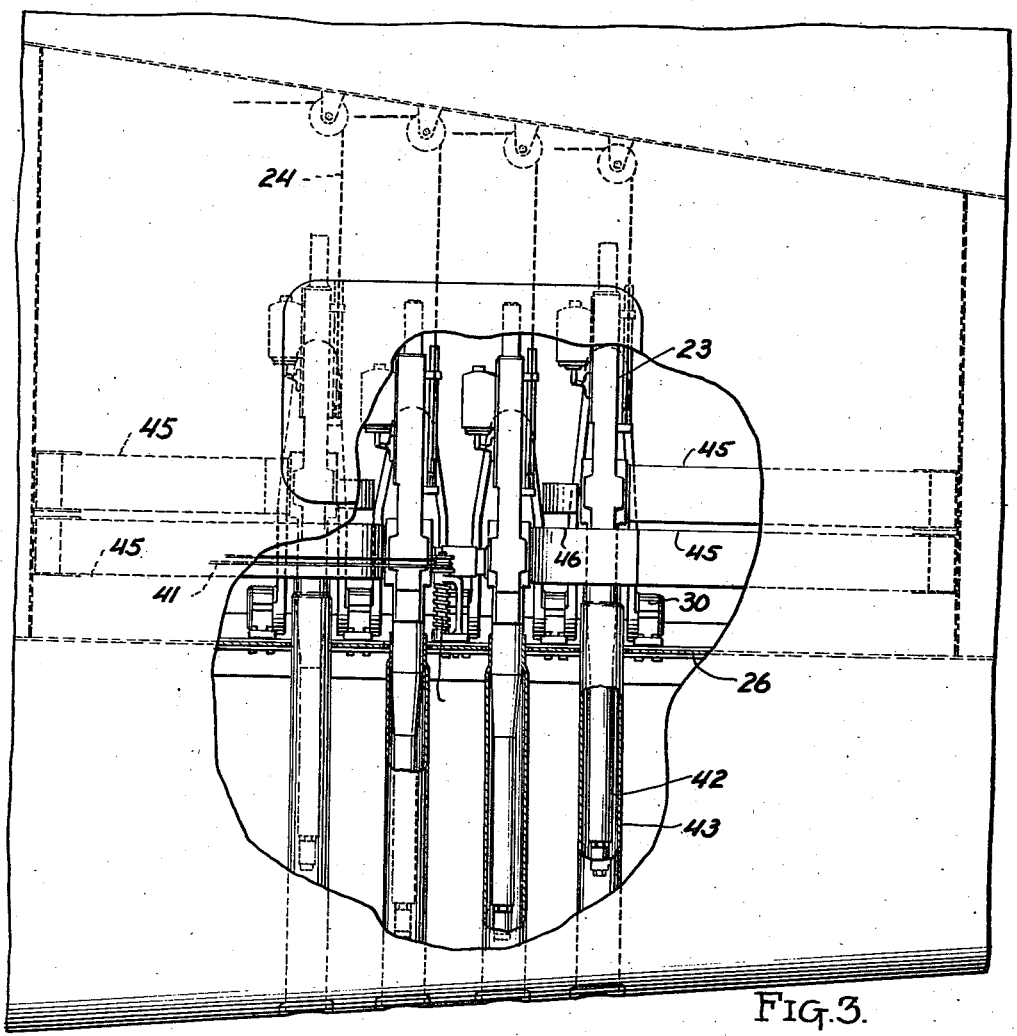
Fig. 3 is a plan of the wing, partly broken away.
Figure 4:
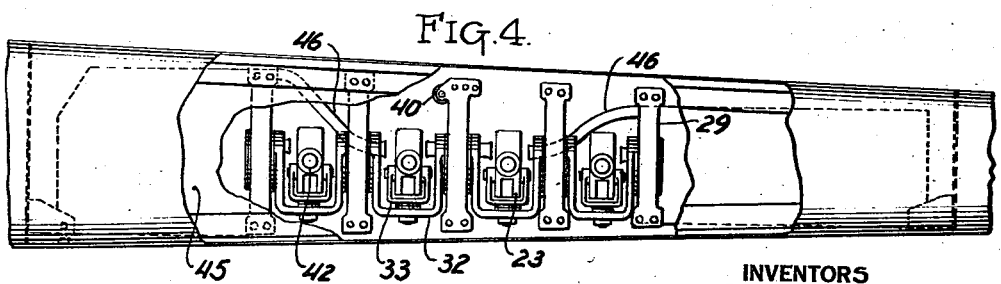
Fig. 4 is a front elevation of a wing, partly broken away.
Figure 5:
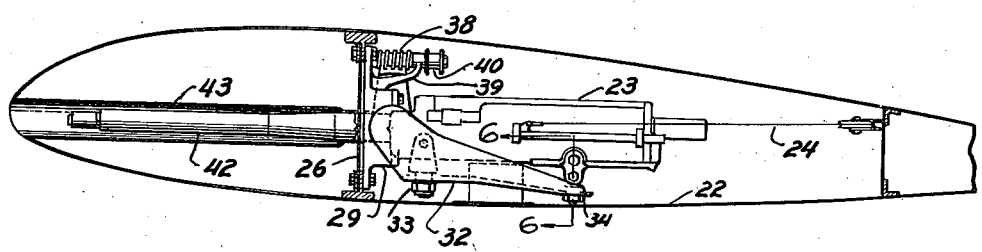
Fig. 5 is a section through the wing profile.

It will be seen that the gun adapter 32 is carried as a cantilever upon the wing beam 26 and the overall height of the gun and adapter assembly is sufficiently small so that the whole organization may readily be confined within a relatively thin wing. Furthermore, since the gun barrels 42 project forwardly of the wing beam, the weight of the barrel serves to partially counterbalance the weight of the adapter 32 and the breech end of the gun which end extends rearwardly of the beam. The organization described permits of easy access through suitable openings in the wing skin for adjustment of the guns in their mounts and also, for removal of the guns from their adapter. Access openings are provided for ammunition containers and feed chutes for the several guns which are shown in Figs. 3 and 4 at 45 and 46. Preferably, with the four guns mounting shown, the two center guns are advanced a short distance with respect to the two outer guns whereby the ammunition containers may be paired and the feed chutes are parallel to one another.

In Figs. 9 to 13 we show an alternative arrangement carrying only a single gun which is rigidly secured to an adapter 50 having horizontal trunnions 51 engaged with separable bearings 52 in a mounting member 53 carrying vertical trunnions 54 engaged by bearings 55 secured to the chord elements 27 of the wing beam 26. The member 53 carries adjusting screws 56 which contact wear plates on the wing beam, and it is obvious that by manipulation thereof the member 53, the adapter 50, and the gun 23 may be swung in a horizontal plane.

The member 53 is provided with a clevised screw 58 passing through a yoke 59 on the adapter 50 and secured by nuts 60 so that by loosening and tightening the nuts 60, the adapter may be swung in elevation about the trunnions 51.

In this arrangement, remote control for elevation adjustment is not shown but same may readily be provided in a manner taught in the first embodiment. A blast tube organization 43 is provided, as previously described, and the gun barrel 42 projects as before through the beam web. The whole gun assembly is carried as a cantilever rearward of the main wing beam and access for replacing ammunition containers and for laying the gun is provided through appropriate openings in the wing skin.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an aircraft wing comprising a transverse spar having an opening therethrough, bearing means secured to said spar, an adapter trunnioned in said bearing means and extending rearwardly therefrom, relatively adjustable elements fixed relative to the spar and adapter spaced from the trunnion axis to vary the angular position therebetween, and a gun secured to said adapter having its barrel projecting through said spar opening forwardly of the trunnion, said adapter and gun being supported as a cantilever from the spar, said barrel serving in part as a counterbalance for the adapter and gun parts rearward of the trunnion.

2. In an aircraft wing comprising a transverse spar having an opening therethrough, bearing means secured to said spar, an adapter trunnioned in said bearing means and extending rearwardly therefrom, relatively adjustable elements fixed relative to the spar and adapter spaced from the trunnion axis to vary the angular position therebetween, a gun secured to said adapter having its barrel projecting through said spar opening forwardly of the trunnion, said adapter and gun being supported as a cantilever from the spar, said barrel serving in part as a counterbalance for the adapter and gun parts rearward of the trunnion, and means to adjust the bearing means upon the spar to change the lateral aiming point of the gun.

3. In an aircraft wing comprising vertically spaced spar elements adjacent the upper and lower wing surfaces, a vertical member bridging said members and comprising between its upper and lower ends an axially lateral trunnion bearing, an adapter having a trunnion in said bearing and extending rearwardly therefrom, an automatic gun having its breech end secured to said adapter, the breech end of the gun lying rearwardly of said spar and the barrel of the gun projecting forwardly between the spar elements and extending forwardly of the trunnion to counterbalance, at least in part, those portions of the gun and adapter lying rearwardly of the trunnion, a part on the vertical bridging member between the trunnion and one of the wing surfaces, and a part on the adapter engageable with the said first part in different positions thereon to afford an elevational adjustment for the adapter and gun.

4. In an aircraft wing comprising vertically spaced spar elements adjacent the upper and lower wing surfaces, a vertical member bridging said members and comprising between its upper and lower ends an axially lateral trunnion bearing, an adapter having a trunnion in said bearing and extending rearwardly therefrom, an automatic gun having its breech end secured to said adapter, the breech end of the gun lying rearwardly of said spar and the barrel of the gun projecting forwardly between the spar elements and extending forwardly of the trunnion to counterbalance, at least in part, those portions of the gun and adapter lying rearwardly of the trunnion, a part on the vertical bridging member between the trunnion and one of the wing surfaces, a part on the adapter engageable with the said first part in different positions thereon to afford an elevational adjustment for the adapter and gun, and means to adjust the vertical trunnion member laterally, about a substantially vertical axis, with respect to said spar.

DONOVAN R. BERLIN.
CLEM G. TRIMBACH.